United States Patent
Brand et al.

(10) Patent No.: US 7,818,682 B2
(45) Date of Patent: Oct. 19, 2010

(54) MODELING EDITOR

(75) Inventors: Christian Brand, Dudenhofen (DE);
Eckart Langhuth, Wiesloch (DE)

(73) Assignee: SAP AG, Walldorf (DE)

( * ) Notice: Subject to any disclaimer, the term of this patent is extended or adjusted under 35 U.S.C. 154(b) by 1087 days.

(21) Appl. No.: 10/999,738

(22) Filed: Nov. 29, 2004

(65) Prior Publication Data

US 2006/0129976 A1    Jun. 15, 2006

(51) Int. Cl.
G06F 3/048    (2006.01)
(52) U.S. Cl. ........................ 715/763; 717/109
(58) Field of Classification Search ................ 717/109; 715/764, 762, 763
See application file for complete search history.

(56) References Cited

U.S. PATENT DOCUMENTS

| | | | |
|---|---|---|---|
| 5,889,991 A * | 3/1999 | Consolatti et al. | 717/109 |
| 6,222,537 B1 * | 4/2001 | Smith et al. | 715/762 |
| 6,741,672 B2 * | 5/2004 | Gaddipati et al. | 378/4 |
| 6,907,581 B2 * | 6/2005 | Noy et al. | 715/863 |
| 7,404,175 B2 * | 7/2008 | Lee et al. | 717/104 |
| 7,607,098 B2 * | 10/2009 | Grehlinger et al. | 715/762 |
| 2004/0054985 A1 * | 3/2004 | Sewell | 717/109 |
| 2005/0050156 A1 * | 3/2005 | Suzuki et al. | 709/217 |

OTHER PUBLICATIONS

Method for Dynamic Loading of Object Modules in a Graphical User Interface Development Tool; IBM Technical Disclosure Bulletin, Dec. 1993. US. vol. 36. Issue 12. pp. 33-36.*

* cited by examiner

Primary Examiner—Tadesse Hailu
Assistant Examiner—Omar Abdul-Ali
(74) Attorney, Agent, or Firm—Fountainhead Law Group PC (57) ABSTRACT

Methods and apparatus, including computer systems and program products, that implement a modeling editor associated with development objects. A computer program product includes instructions operable to receive user input including a user-defined graphical object, and a selection of a development object from a set of development objects in a development environment; generate an association between the selected development object and the user-defined graphical object; generate a graphical representation including the user-defined graphical object; and store the graphical representation and the association in a document. A graphical object need not be associated with any of the development objects. The user-defined graphical object can be presented to a user. Presenting the user-defined graphical object can include selectively presenting information associated with the user-defined graphical object based on user settings, such as abstraction information that can define an abstraction level for presenting the user-defined graphical object.

26 Claims, 4 Drawing Sheets

MODELING EDITOR

BACKGROUND

The following specification relates to a modeling editor associated with development objects.

Computer programs or applications are typically developed in a development environment. A development environment typically includes one or more tools that assist a programmer in developing an application. Although a development environment can be an integrated development environment, such that the tools that make up the development environment are tightly coupled, a development environment can be broadly interpreted as including separate programs or tools that are not coupled together. Some development environments can include a combination of integrated and non-integrated tools.

Within a development environment, an application can be developed using various architectures. In general, an architecture specifies the types of development objects or components that can be used to build applications, as well as the relationships that can be used to connect those components. In a given architecture, development objects can be organized by any combination of relationships, including hierarchical relationships, grouping relationships, and the like. In an object-oriented architecture, for example, an application defined by an architecture can include a combination of various data objects and resources (i.e., development objects). In that example, relationships among the development objects can include a relationship indicating that one data object inherits characteristics from another data object.

Another example architecture is the model-view-controller (MVC) architecture. Applications built using the MVC architecture typically include three different types of components—models, which store data such as application data; views, which display information from one or more models; and controllers, which can relate views to models, for example, by receiving events (e.g., events raised by user interaction with one or more views) and invoking corresponding changes in one or more models. Models and controllers typically include computer program code. When changes occur in a model, the model can update its views. Data binding can be used for data transport between a view and its associated model or controller. For example, a table view (i.e., a table including cells that are organized in rows and columns) can be bound to a corresponding table in a model or controller. Such a binding indicates that the table is to serve as the data source for the table view, and consequently that the table view is to display data from the table. Continuing with this example, the table view can be replaced by another view, such as a graph view. If the graph view is bound to the same table, the graph view can display the data from the table without requiring any changes to the model or controller. In the MVC architecture, development objects can include models, views, controllers, and components that make up the models, views, and controllers. For example, application data in a model can be an example of a-component that is a development object.

To graphically model an application, such that a combination of abstract, graphical representations represent the components of the application and the relationships between those components, a developer typically uses a drawing tool, such as Microsoft Visio (available from Microsoft Corporation of Redmond, Wash.), that provides abstract representations and tools for manipulating and/or generating abstract representations. For example, a user of a drawing tool can choose to use a circle (i.e., an abstract representation) to represent a class (e.g., a class defined in the C++ programming language) of an application developed under an object-oriented architecture. The circle that represents a development object can include data from the development object. For example, a name of a class (i.e., data from a development object) can be entered in a text box that is part of the circle, and that name can be displayed in the center of the circle.

In addition to drawing tools, a developer can also use other graphical tools to generate graphical representations (e.g., Unified Modeling Language diagrams) from application code, or vice versa. For example, Rational Rose (available from International Business Machines Corporation, White Plains, N.Y.) is a tool with which a user can create and modify Unified Modeling Language diagrams without necessarily generating code. Thus, in Rational Rose, a binding between coding fragments and components of a Unified Modeling Language diagram (i.e., graphical representations) is not necessary. In Rational Rose, a diagram can be exported into a unified format (".mdl" file) and the exported diagram can be used as input for many different code generating facilities.

SUMMARY

Described herein are methods and apparatus, including computer program products, that implement a modeling editor associated with development objects.

In one general aspect, the apparatus feature a computer program product, which is tangibly embodied in an information carrier. The computer program product includes instructions operable to cause data processing apparatus to receive user input including a user-defined graphical object, and a selection of a development object from a set of development objects in a development environment; generate an association between the selected development object and the user-defined graphical object; generate a graphical representation including the user-defined graphical object; and store the graphical representation and the association in a document.

Implementations can include one or more of the following features. The user input can further include user input to generate the user-defined graphical object using a vector-based drawing tool and the computer program product can further include instructions operable to generate the user-defined graphical object in the drawing tool in response to the user input to generate the user-defined graphical object. The user-defined graphical object can include a first type of attribute defining an association between a first user-defined graphical object and a first development object, and a second type of attribute defining an attribute that is not associated with the first development object. The user-defined graphical object can be a free-formed object or a pre-defined object selected from a template of graphical objects. The association can include a link from the user-defined graphical object to the selected development object and the computer program product can further include instructions operable to maintain the link in the development environment.

The computer program product can further include instructions operable to generate a first graphical object that is not associated with any development object. The instructions to generate an association between the selected development object and the user-defined graphical object can include instructions to generate the association between a user-defined development object, for all instances of the user-defined development object, and the user-defined graphical object. The user-defined development object can be a user-defined class. The computer program product can further include instructions operable to present to a user the user-defined graphical object and information from the associated development object.

The instructions operable to present to a user the user-defined graphical object can include instructions operable to selectively present information associated with the user-defined graphical object based on user settings. The user settings can include abstraction information. The computer program product can further include instructions operable to derive text from data in the associated development object according to one or more naming conventions; and present the user-defined graphical object such that the derived text is presented in the user-defined graphical object. The computer program product can further include instructions operable to present to a user the user-defined graphical object according to a schema that corresponds to the associated development object.

The user input can further include user descriptions of the user-defined graphical object, where the computer program product further including instructions operable to present the user-defined graphical object and the user descriptions. An application including the development objects can include a relationship between a first development object and a second development object, where the computer program product further includes instructions operable to generate a relationship between a first graphical object and a second graphical object that corresponds to the relationship between the first and second development objects; and generate a layout for the first and second graphical objects according to the relationships between the first and second graphical objects.

The computer program product can further include instructions operable to receive a request to modify the selected development object that can be associated with the user-defined graphical object; in response to the request, modify the selected development object; in response to the request, modify the user-defined graphical object; and present the modified user-defined graphical object. The instructions operable to modify the selected development object can include instructions operable to execute a development tool associated with the selected development object.

The computer program product can further include instructions operable to support a dynamic development process involving multiple iterations of developing the development object and the user-defined graphical object, where the development object and the user-defined graphical object are more refined in each successive iteration. The user-defined graphical object can includes at least one field corresponding to a component of the associated development object, where the computer program product further includes instructions operable to generate the component of the associated development object based on one or more values in the field corresponding to the component.

In another aspect, a system for designing and modeling applications includes a first tool and a second tool. The first tool is operable to display one or more development objects of an application being developed. The second tool is operable to display a graphical model corresponding to the development objects, where the graphical model includes at least a first user-defined graphical object and a second user-defined graphical object, the first user-defined graphical object is associated with at least one of the development objects, the second user-defined graphical object is not associated with any of the development objects, and the second tool is operable to enable a user to associate any of one or more selected graphical objects from a set of graphical objects, including the first and second user-defined graphical objects, with any of the development objects.

Implementations can include one or more of the following features. The graphical model can further include information from one or more associated development objects. The graphical model can further include text derived from data in associated development objects according to one or more naming conventions. The second tool operable to display a graphical model can include the second tool operable to display graphical objects associated with development objects according to a schema that corresponds to the associated development objects. The first user-defined graphical object can include descriptions of the associated development objects, and the second tool operable to display the graphical model can include the second tool operable to display the user descriptions.

The application can further include a relationship between a first development object and a second development object, where the second tool can be further operable to generate a relationship between a first graphical object and a second graphical object that corresponds to the relationship between the first and second development objects, and generate a layout for the first and second graphical objects according to the relationship between the first and second graphical objects. The second tool operable to display the graphical model can include the second tool being operable to display the selected graphical objects according to the generated layout. The second tool can be further operable to receive a request to modify the selected graphical object from the selected graphical objects; and in response to the request, modify the selected graphical object. The second tool can be further operable to modify one or more development objects associated with the selected graphical object. The second tool can be further operable to receive a request to modify a selected development object that can be associated with at least one of the selected graphical objects; in response to the request, modify the selected development object; and in response to the request, modify the at least one of the selected graphical objects.

The second tool operable to display the graphical model can include the second tool being operable to display selectively information associated with the selected graphical objects based on user settings. The user settings can include abstraction information.

In another aspect, a method of designing and modeling applications includes receiving a user-defined graphical object and a selection of a development object from a set of development objects in a development environment; generating an association between the selected development object and the user-defined graphical object; generating a graphical representation including the user-defined graphical object; and storing the graphical representation and the association in a document.

Implementations can include one or more of the following features. The user-defined graphical object can include a first type of attribute defining an association between a first user-defined graphical object and a first development object, and a second type of attribute defining an attribute that is not associated with the first development object. The association can include a link from the user-defined graphical object to the selected development object. The method can further include maintaining the link in the development environment. The method can further include generating a first graphical object that is not associated with any development object.

The method can further include presenting to a user the user-defined graphical object and information from the associated development object. Presenting to a user the user-defined graphical object can include selectively presenting information associated with the user-defined graphical object based on user settings. The method can further include presenting to a user the user-defined graphical object according to a schema that corresponds to the associated development object. An application including the development objects can include a relationship between a first development object and a second development object, and the method can further include generating a relationship between a first graphical object and a second graphical object that corresponds to the relationship between the first and second development objects; and generating a layout for the first and second graphical objects according to the relationships between the first and second graphical objects. The method can further include receiving a request to modify the selected development object that can be associated with the user-defined graphical object; in response to the request, modifying the selected development object; in response to the request, modifying the user-defined graphical object; and presenting the modified user-defined graphical object.

The mechanisms and techniques described here may provide one or more of the following advantages. A development environment can include a modeling editor. The modeling editor can be connected with the development environment such that the modeling editor and/or the development environment can automatically generate an application model (e.g., a model of an application that is being developed) from a graphical model, and/or vice versa. The modeling editor can allow a user to freely choose graphical objects that can represent one or more development objects, or no development objects at all. The modeling editor can support representing different abstraction levels that correspond to a graphical model. For example, a modeling editor can support modeling a detailed view or an abstract view of a graphical model. This can advantageously allow for the same graphical model to be used for different audiences. The information that is represented in a graphical model can be freely edited. For example, a graphical model can be edited to include user-descriptions or business information that is not part of the development objects and/or relationships among development objects. Changes to development objects and/or relationships among development objects can be automatically reflected in an associated graphical model, and/or vice versa. For example, if a new development object is added to an application that is being developed, a corresponding graphical object can be added to an associated graphical model.

Details of one or more implementations are set forth in the accompanying drawings and the description below. Other features and advantages may be apparent from the description and drawings, and from the claims.

BRIEF DESCRIPTION OF THE DRAWINGS

These and other aspects will now be described in detail with reference to the following drawings.

DETAILED DESCRIPTION

Figure 1:
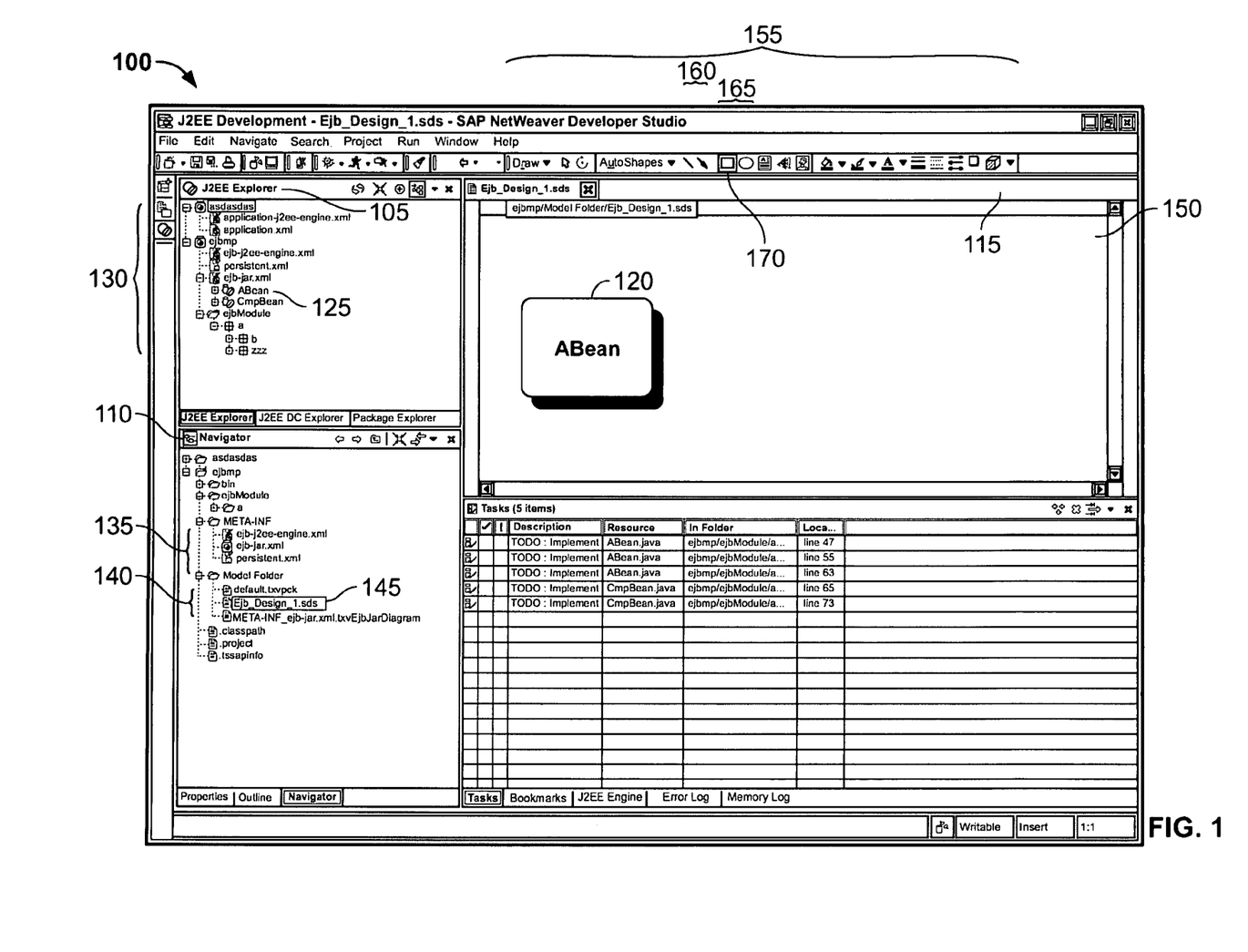
FIG. 1 is an illustration of an integrated development environment.

FIG. 1 is an illustration of an integrated development environment (IDE) 100. The IDE 100 includes a variety of tools, such as a project manager 105, a resource manager 110, and a modeling editor 115. As reflected in the illustrations of the tools, the IDE 100 is used to draft a graphical model corresponding to an application model (i.e., a model of an application being developed that can include development objects and/or relationships among development objects). In that graphical model, a box 120 corresponds to a development object 125.

The project manager 105 provides a user interface for managing an application model corresponding to an application that is being developed (i.e., the user interface provides a design-time view of an application). In that user interface, the project manager 105 includes a hierarchical view 130 of various development objects. Applications are assembled out of development objects. The IDE 100 can be used to develop applications based on Java 2 Enterprise Edition (hereinafter "J2EE"; J2EE specification available from Sun Microsystems, Inc. of Santa Clara, Calif.). The development objects in view 130 include J2EE JavaBeans, such as a JavaBean "Abean" represented by development object 125, and XML (Extensible Markup Language) pages. Thus, the hierarchical view 130 of development objects includes a hierarchy of JavaBeans and XML pages. In alternative implementations, differing levels of detail can be provided in the hierarchical view 130 of development objects. Also, in alternative implementations, programming languages other than J2EE can be depicted in the project manager 105.

The resource manager 110 provides a view of resources, such as image files, source code, and the like, that are related to an application that is being developed. For example, the resource manager 110 provides a view of XML source code files 135 that are used to generate the application being developed, and files 140 that are persisted versions of the graphical model of that application. One of the files that corresponds to the graphical model is a file 145 that corresponds to the box 120. In alternative implementations, additional and/or different types of resources can be displayed in the resource manager 110.

The modeling editor 115 is a tool that can be used to draft (e.g., generate and/or edit) graphical models, such as graphical models that represent development objects and/or relationships among development objects. Different levels of support for drafting graphical models, are provided by the modeling editor 115. To provide support for drafting graphical models, the modeling editor has a variety of user interface components and tools that can be used to freely draft graphical models. Because graphical models that are drafted using the modeling editor 115 might represent development objects and/or relationships among development objects, a variety of mechanisms and techniques are implemented in, and supported by, the modeling editor 115 and the IDE 100 to associate parts of graphical models with development objects and/or relationships among development objects.

The modeling editor 115 provides support for many different techniques for drafting graphical models. For example, graphical models that are drafted with the use of the modeling editor 115 can be automatically drafted by the modeling editor 115, such that a user need only develop an application model (i.e., a model of development objects and relationships among the development objects that represent an application) and the modeling editor 115 can draft a corresponding graphical model. Automatically drafting a graphical model can include drafting one or more graphical objects for one or more development objects of an application model (i.e., an n to m relationship). In addition, automatically drafting a graphical model can include drafting relationships in a graphical model (e.g., arrows that represent dependencies or arrows that represent grouping relationships) that correspond to relationships in an application model (e.g., a hierarchy between objects). As another example of a technique for drafting graphical models, graphical models can be manually drafted. In other words, a user can use various tools, such as a paintbrush or a stencil selector, provided by a modeling editor, to manually draft a graphical model.

Any combination of techniques can be used to draft a graphical model. For example, a graphical model can be automatically drafted and then manually modified by a user. In that example, a user can have a modeling editor automatically draft the box 120 that is associated with the development object 125. Then, a user can use a fill-in tool to color the box 120 with a specific color.

Other types of support can be provided by the modeling editor 115. For example, support for drafting the graphical objects can include support for updating a graphical object or development object in response to a change to an associated development object or graphical object, respectively. As an example, if a user changes the name of the development object 125, the box 120 can be updated to reflect that change. As another example, if a user changes the name in the box 120, the associated development object 125 can be updated to reflect that change.

To provide support for drafting graphical models, the modeling editor 115 includes a modeling area 150 and drafting tools 155. The modeling area 150 provides an interface for viewing, generating, and editing graphical models and components of the graphical models. For example, the box 120, which is a component of a graphical model, can be viewed in the modeling area 150.

To generate and edit a graphical model, the drafting tools 155 are provided. The drafting tools 155 include line drawing tools 160 and automatic shape tools 165 (a variety of tools that can be provided by a modeling editor are discussed in more detail with reference to FIG. 2). Any combination of these tools can be used to freely generate a graphical model that can be associated with an application model. For example, the box 120 can be generated using one of the automatic shape tools 165, such as the automatic box drawing tool 170. Then, the text "Abean" (the name of the corresponding development object 125) can be automatically generated and included in the box 120 in response to a user having right-clicked on the box 120 and having selected a tool that associated the box 120 with the development object 125. In alternative implementations, a combination of mechanisms can be provided by a modeling editor to support drafting of graphical models. Also, although the modeling editor 115 is implemented in a graphical user interface, other types of interfaces can be used to implement a modeling editor. For example, a model can be edited using a command-line interface and graphical models that are drafted using the command-line interface can be displayed as an image. In alternative implementations, additional and/or different types of support for drafting a graphical model can be provided by the modeling editor 115.

A variety of mechanisms and techniques are implemented in, and supported by, the modeling editor 115 and the IDE 100 to associate graphical models with development objects and/or relationships among development objects. These techniques and/or mechanisms include techniques and/or mechanisms that can generate associations. For example, a wizard is a mechanism that can be used to generate associations. One type of wizard that can be provided is a wizard that is capable of generating development objects and/or relationships among development objects from a graphical model, or vice versa. That wizard, as part of generating the development objects and/or relationships among development objects, or a graphical model, can generate data bindings (i.e., a type of association) between graphical objects, and development objects and/or relationships among development objects. As another example, a graphical object can be associated with a development object via a series of interactions in a graphical user interface. In that example, a graphical object, such as the box 120, can be right-clicked and a context menu can appear. From that context menu, a menu item named "associate with a development object . . . " can be selected and, in response to that selection, a selection of development objects can be made in a user interface that has a selectable list of development objects. In that example, an association is generated in response to a selection of development objects.

Many different types of associations that define a relationship between a graphical object and a development object can be generated by the modeling editor 115. As an example, a connection, such as a link or a reference, can be used by a modeling editor such that a graphical object can be edited by clicking on a development object, and vice versa. A link is a type of connection between software components, for example, a connection between a development object and a graphical object, that can be used for navigating between components. A link can be maintained in the development environment. A link can be maintained such that there is a degree of "liveness" to the link. As an example, if a link allows a user to navigate from a graphical object to a corresponding development object, maintaining the link can include storing the link in a table in volatile memory such that if a change is made to a graphical object and/or a development object, the link is still valid and/or usable. As an example of a link or reference, a link or reference can enable a user to open a source code editor such that the source code corresponding to the graphical object may be edited. Another type of link or reference may navigate a user to a responsible developer for development objects corresponding to a graphical object, including a picture of the developer and their contact information (e.g., an email address and phone number). As another example of an association, a data-binding (i.e., another type of connection; e.g., a static binding that is bound at design time) can exist between a development object and a graphical object, such that text from a development object is included in a graphical object. In that example, if the development object is changed, the graphical object is automatically updated to reflect that change. In another example, a graphical model can be used as a development object. In that example, an association of a first graphical model with a development object (that is a second graphical model) can be defined as the inclusion of the second graphical model as a graphical object within the first graphical model (i.e., a nested inclusion). Thus, the association can be interactive, such that, for example, manipulating a development object can cause a response in an associated graphical object, and/or vice versa. The connection can be an attribute of a graphical object.

In alternative implementations, any type of association can exist between a graphical object and a development object. In addition, any combination of mechanisms and/or techniques can be used to generate associations between a graphical model and, development objects and/or relationships among development objects. In some implementations, objects other than development objects can be associated with graphical objects. For example, in some implementations, a word processing document including a description of a graphical object may be associated with the graphical object and by clicking on the graphical object the word processing document can be opened for viewing and/or editing.

A graphical model that is drafted by the modeling editor 115 need not be limited to a representation of data from an application model. Additional information that is not connected to the development object by a link or other type of connection can be an attribute of a graphical object. For example, a comment, such as an explanation or description text, can be added to the box 120 and that comment need not be associated with the development object 125 by a link or other type of connection. Thus, there can be a dichotomy of two types of attributes, one which is an association that defines a relationship between a graphical object and one or more development objects, and another that is additional information, such as comments, and need not define a relationship. In that dichotomy, a change to the first type of attribute (e.g., properties of an underlying attribute) can always be reflected in a corresponding development object; whereas, no change to a second type of attribute should be reflected to a development object that corresponds to the graphical object. For example, if a change is made to a variable that is represented in a graphical object, the corresponding variable in the development object can be changed if the variable is of the first type of attribute. As another example, if a comment in a graphical object is changed, no comment would be changed in a corresponding development object.

Although graphical objects are depicted as being associated with development objects and/or relationships among development objects, graphical objects need not be associated with development objects and/or the relationships among development objects. For example, an association between the box 120 and the development object 125 need not be generated. The ability to add information that is not part of an application model to a graphical model can be advantageous, as the modeling editor may be used to add user descriptions or business information, such as deadline information, sales figures, pictures of people, and the like, that is depicted in any form, such as text, charts, photos, and the like, to a graphical model.

The ability to add information that is not bound to an application model (e.g., graphical objects that are not associated with development objects) may allow programmers to have a dynamic development process that involves multiple iterations through graphical models, where, in each iteration, one or more graphical objects can be created and/or refined, development objects can be created and/or defined, and those development objects can be bound to the graphical objects. In addition to adding information that is not bound to an application model, a graphical model may be bound to an application model and the graphical model and/or application model need not be fully developed, which may further provide advantages for dynamic development of an application. As an example of a dynamic development process, a developer may start a project by creating an overview of the project using graphical objects that are not bound to development objects. Developers may work in teams on different portions of those graphical objects. After developing several development objects, the development objects can be bound to the graphical objects. Then, the developers may further refine the graphical model by defining more details in the graphical objects or defining more graphical objects. The developers may further define the development objects based on the refined graphical models. Then, the process may continue in another iteration where developers further refine the graphical model, and so on.

When development objects are associated with graphical objects, a user can be given a choice to change properties of the graphical objects (e.g., a choice to change the shape of a graphical object or the type of graphical object that represents a development object). By changing some of the properties of the graphical objects, additional changes may be reflected in the graphical model. For example, by changing a shape of a graphical object, the graphical model may be changed to reflect the change of the shape.

Properties (i.e., attributes; e.g., links) of a development object and/or development model can be changed from a corresponding graphical representation. Any changes made can be reflected in the graphical representation and the corresponding development object and/or development model. For example, a graphical representation of a class may include a representation of a closed bullet shape corresponding to a variable of data type integer. By clicking on the graphical representation, a user can change the data type of the variable to float, which can cause the corresponding bullet shape to become and open bullet shape and likewise cause the class to have a variable of data type float, rather than integer. As another example, a graphical object shaped like a square can be associated with a class named "car" and a property of the graphical object can be changed such that the square is associated with a different development object.

To facilitate generation of development objects, a user can choose various graphical objects that correspond to different types of development objects, and the user can use a graphical model to create the corresponding development objects. Thus, a graphical model may be defined in multiple iterations and each iteration may result in refined and/or new development objects that represent an application. Each refinement of a graphical model may correspond to abstraction levels (discussed later) such that for each iteration of refinement, a different abstraction level corresponding to a graphical model may exist. For example, if there are three iterations through a graphical model, each iteration can have a corresponding abstraction level reflecting a different level of refinement. In addition, other advantages may be realized through dynamic approaches to developing graphical models.

Figure 2:
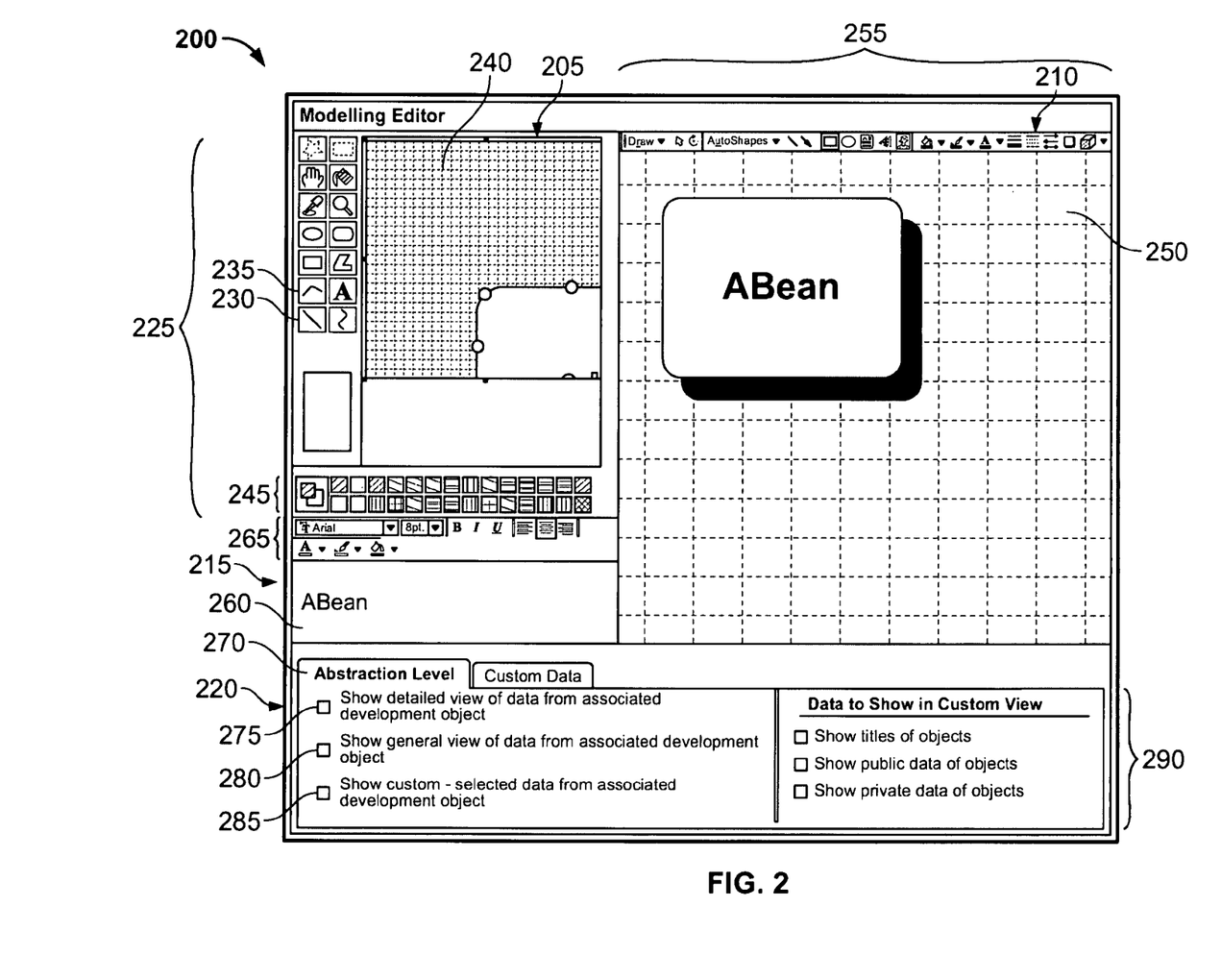
FIG. 2 is an illustration of a modeling editor.

FIG. 2 is an illustration of a modeling editor 200. The modeling editor 200 is a tool in an integrated development environment that can be used to draft graphical models that represent development objects and/or relationships among development objects. The modeling editor 200 includes a variety of user interface components and tools that can be used to freely draft graphical models. The main areas of the user interface for the modeling editor 200 include a vector-based graphics editor 205, a view area 210, a text editing area 215, and an abstraction level settings area 220.

The modeling editor 200 can include a vector-based graphics editor 205 and/or a shape editor (not shown). A vector-based editor can use vectors to represent shapes, thus resized graphical objects can be more accurately displayed (e.g., a thickness of a line is not enlarged when a shape is enlarged). Vector-based editing tools 225 include various vector-drawing tools, such as a straight vector tool 230 and a curved vector tool 235. To provide an enlarged or minimized view of graphical objects, the vector-based graphics editor 205 includes a view 240 where different levels of magnification of graphical objects can be provided that can differ in contrast to the level of magnification used by the view area 210.

A shape editor can enable a user to create shapes that can correspond to development objects. Some of the shapes can be default shapes that correspond to a specific type of development object. For example, in one shape editor, a box shape can correspond to an object-oriented class definition. Default shapes can include fields or properties that correspond to various aspects of a corresponding development object. Following the prior example, the box shape can include a list of methods and a list of variables that correspond to methods and variables that should exist in a corresponding development object. A shape editor can enable a user to extend the definition of shapes (e.g., add new types of fields that correspond to components of a corresponding development object) and/or create new shapes that can correspond to development objects. Because shapes may have corresponding development objects, the modeling editor 200 may fill the content of a graphical object (i.e., a shape) with the content of a development object that is bound to that graphical object (or, vice versa, the information from a shape may be used to fill in the content of a development object that is bound to the shape).

Information that is added to a shape need not correspond to a development object. A shape editor can have extensions that can be defined such that content from outside of a modeling editor may become part of a graphical object. For example, one shape editor can enable a user to add content to a shape, such as a text field containing the current temperature in Rome, which is received from a web service (where the text field and its interaction with the web service can be defined by a user in the shape editor and does not correspond to a development object).

In addition to, or instead of, including the vector-based graphics editor 205, the modeling editor 200 can include a pixel-based graphical editor. The pixel-based graphical editor can be used to paint graphical objects using painting tools, such as a fill tool for filling large areas of a graphical object with a color or color pattern, and a pencil tool for freely drawing designs.

The view area 210 includes a view 250 of graphical objects and a drafting toolbar 255. The view 250 is an interactive area for generating and editing graphical objects. The drafting toolbar 255 includes tools that can be used in the view 250 or the view 240 to generate and edit graphical objects. For example, the drafting toolbar 255 includes autoshape tools (i.e., tools that automatically generate stencils such as circles, squares, flowchart arrows, and the like) that can be used in the view 250 or the view 240.

The text editing area 215 can be used to edit text in a graphical model. The text editing area includes a text field 260 for editing text and a set of text-formatting tools 265 that can be used to edit a format of text. The text-formatting tools 265 include tools for choosing a type of font (e.g., Arial, Times New Roman, and Courier), a size of font, a font style (e.g., italic, bold, underlined), a color of a font, and the like. The text that is depicted as being edited in the text field 260 is text from a graphical object that is also depicted in the vector-based graphics editor 205 and the view area 210. That text corresponds to the name of a development object. Although that text is derived from a development object, the text in a graphical model can be edited and text objects can be added to a graphical model such that text that is not derived from an application model, such as comments and the like, can be added to a graphical model.

The abstraction level settings area 220 provides settings that can be used to select a level of information (e.g., a degree of detail) that will be used to represent an application model as a graphical model. An abstraction level tab 270 includes checkboxes 275, 280, and 285, that can be used to select a level of abstraction. The detailed view checkbox 275 can be checked if a user desires a detailed graphical model of an application model. As an example of a detailed view, if an application model is based on an object-oriented programming language such as Java (language specification available from Sun Microsystems, Inc. of Santa Clara, Calif.), the detailed view can include all the data structures, and the names of functions and variables in each data structure.

The general view checkbox 280 can be checked if a user desires a higher-level graphical model of an application model. In contrast to the previous example, a general view of an application model based on a programming language, such as Java, might only include the names of data structures and might not include details, such as the names of variables and functions. Graphical objects of a graphical model need not have a one-to-one correspondence to development objects in an application model. Thus, as another example of a general view, a graphical model can be generated and various graphical objects of the generated graphical model can be associated with an application model. In that graphical model, one graphical object called "Calendar tool" might be associated with several development objects (i.e., not a one-to-one association). To support modifications to abstraction levels, the prior example general view can be persisted by the modeling editor 200 such that, when the general view checkbox 280 is selected, the modified general view can be retrieved from a persistence area and displayed in the view area 210.

The custom abstraction level checkbox 285 supports automatic generation of an abstraction level of a graphical model based on various settings 290. The settings 290 allow a user to select different types of information that should be included or hidden in a graphical model that is displayed in the view area 210. Those settings include checkboxes for selecting whether titles (i.e., names), public data (e.g., public member functions in a data object, such as a class, that can be accessed from other data objects), and private data (e.g., member variables and functions in a data object, such as a class, that can only accessed via that data object) of development objects should be displayed in a graphical model.

The different levels of abstraction that are supported by the modeling editor 200 may advantageously allow a user to design a single graphical model, and from that graphical model, use different abstraction levels for different audiences. For example, staff that is managed on a programming project can include a marketing person and a programming team that consists of several programmers and a programming manager. The programming team can generate an application model for the project. Then, using a modeling editor, such as the modeling editor 200, the programmers can generate a graphical model based on the application model. Based on that graphical model, the programmers can use a detailed abstraction level of the graphical model when discussing the application model amongst themselves. However, the marketing person can use a customized view of the application model that is more abstract to create brochures about the project that might be more useful for marketing presentations. Also, the programming manager can have her own customized level of abstraction of the graphical model, which may allow the programming manager to have a high enough level of view of the application model to make management decisions, and a detailed enough view to discuss details of the application model with the programmers.

The types of development objects across which graphical objects can be associated can differ. In one implementation, different general types of development objects, such as basic data types or general concepts of a programming language, can be associated with different development objects. For example, all concrete classes (i.e., classes in object oriented programming that have all methods implemented) can be represented by circles and all abstract classes can be represented by triangles. In another implementation, associated graphical objects can differ across user-defined development objects. For example, a class defined as car can be represented as a circle and a class defined as bicycle can be represented as a square. In another implementation, graphical objects can differ depending on an associated declared instance. For example, a declared instance "Lincoln" of a class car can be associated with a first shape and a declared instance "Buick" of the class car can be associated with a second shape. In some implementations, there may be a combination of types of development objects across which associated graphical objects can be associated. As example, a combination can include user-defined development objects and general types of development objects. In that example, different shapes can be associated with general types of development objects and different colors can be associated for user-defined objects.

In alternative implementations of the modeling editor 200, the modeling editor can support additional and/or different levels of abstraction. For example, instead of having two default abstraction levels (i.e., detailed view and general view), there can be ten levels of abstraction. In addition, the type of support of different levels of abstraction can vary. For example, instead of having a selection of an abstraction level for each graphical model, different abstraction levels can be selected for each graphical object in a graphical model (i.e., a selection of different abstraction levels for each graphical object rather than the entire graphical model). Also, because a graphical model can be modified within each abstraction level, each abstraction level can have its respective modifications that are specific to an abstraction level, or modifications to an abstraction level can be reflected across one or more abstraction levels. For example, if a general view of a graphical object is modified, the modification can be reflected in a detailed view of similar graphical objects.

Although the modeling editor 200 includes a specific set of tools and type of user interfaces, in other implementations, any combination of tools and/or user interfaces can be provided in a modeling editor. Also, although the modeling editor 200 is part of an integrated development environment, in alternative implementation the modeling editor 200 can be part of a non-integrated development environment. For example, the modeling editor 200 can be a software application that is not coupled with other parts of a development environment. In that example, the modeling editor can generate a graphical model from a persisted copy of an application model.

Figure 3:
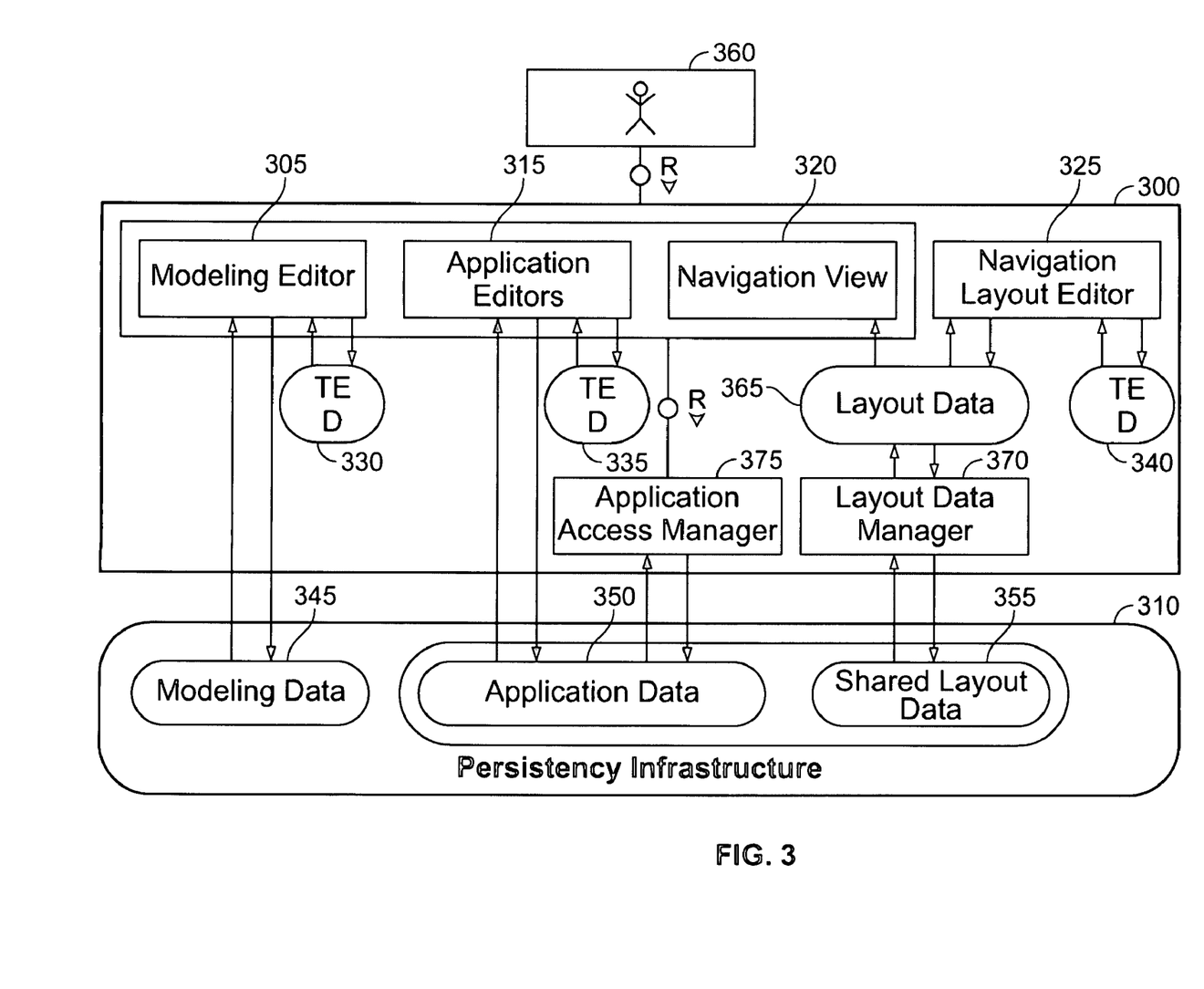
FIG. 3 is a diagram of an integrated development environment that includes a modeling editor.

FIG. 3 is a diagram of an integrated development environment 300 that includes a modeling editor 305. The diagram depicts data flow among various components of the development environment 300 and a persistency infrastructure 310. In addition to the modeling editor 305, the development environment includes application editors 315; a navigation view 320; a navigation layout editor 325; and temporary editing data stores 330, 335, and 340.

The modeling editor 305 is used to draft graphical models. A graphical model represents an application model and includes one or more graphical objects. Graphical models can be associated with an application model by associating any number of graphical objects with any number of development objects and/or relationships among development objects. Graphical objects can be associated with development objects before or after the graphical objects are generated. As an example, a graphical object can be generated, such as a circle, and then the graphical object can be associated with a development object, such as a Java class. As another example, a user can choose to associate an application model with a graphical model, then one or more graphical objects might be generated. As discussed previously, an association of a graphical object with a development object can be any type of association.

The application editors 315 include editors that can be used to edit an application model. As examples, the application editors 315 can be source code editors, semantic editors, user interface editors (i.e., editors that allow user interface components of an application to be edited), and the like. The application editors 315 can be invoked in response to user input received in the modeling editor 305. This may occur, for example, as a result of a user selecting a graphical object that is associated with a development object, and a selection of a context menu item such as "edit associated development object." In other implementations, the modeling editor 305 can be invoked in response to user input received in one of the application editors 315.

Navigation views 320 provide a user with views of tools, such as the modeling editor 305 and the application editors 315. Thus, the navigation views 320 provide a user interface to a user 360. The views that are part of the user interface can include any combination of user interface elements, such as interactive view areas, toolbars, menus, context menus, windows, text fields, and the like. The navigation views determine the layout of tools with reference to the layout data 365, which can be generated by the navigation layout editor 325 and managed by the layout data manager 370. Thus, the navigation layout editor 325 allows the user 360 to customize the navigation views 320 by generating and editing the layout data 365. The layout data manager 370 manages importing and exporting of layout data to other applications by managing persistence of shared layout data 355.

The temporary editing data stores 330, 335, and 340 provide an area for storing temporary data that is used when the development environment 300 is running. The temporary data includes data that might not be persisted and should be easily accessible while an editor, such as the modeling editor 305 is running. As an example, the temporary editing data store 335 stores application data and can store source code that has been edited, but has not yet been persisted.

The persistency infrastructure 310 is a structure for persisting information, including modeling data 345, application data 350, and the shared layout data 355. The modeling data 345 is data that can be used by the modeling editor 305 to generate displays of graphical models and can support editing of graphical models. The modeling data 345 can include graphical models, user settings (e.g., abstraction level settings), associations between graphical models and application models, and the like. The application data 350 includes a collection of data that can be used to edit an application and generate a runtime instance of an application. Thus, the application data 350 includes development objects, which can include application programming interface libraries, source code, images, compile-time dependency files (i.e., a file used to indicate dependencies among files, thus assisting in the automation of compiling; e.g., a makefile (make available from Free Software Foundation, Inc. of Boston, Mass.)). The application data 350 is managed by the application access manager 375, which limits access to application data depending on a role of the user 360. The persistency infrastructure 310 can be of any type. For example, the persistency infrastructure can include any number of local databases. In alternative implementations the data flow and/or components in the diagram of FIG. 3 can differ.

Figure 4:
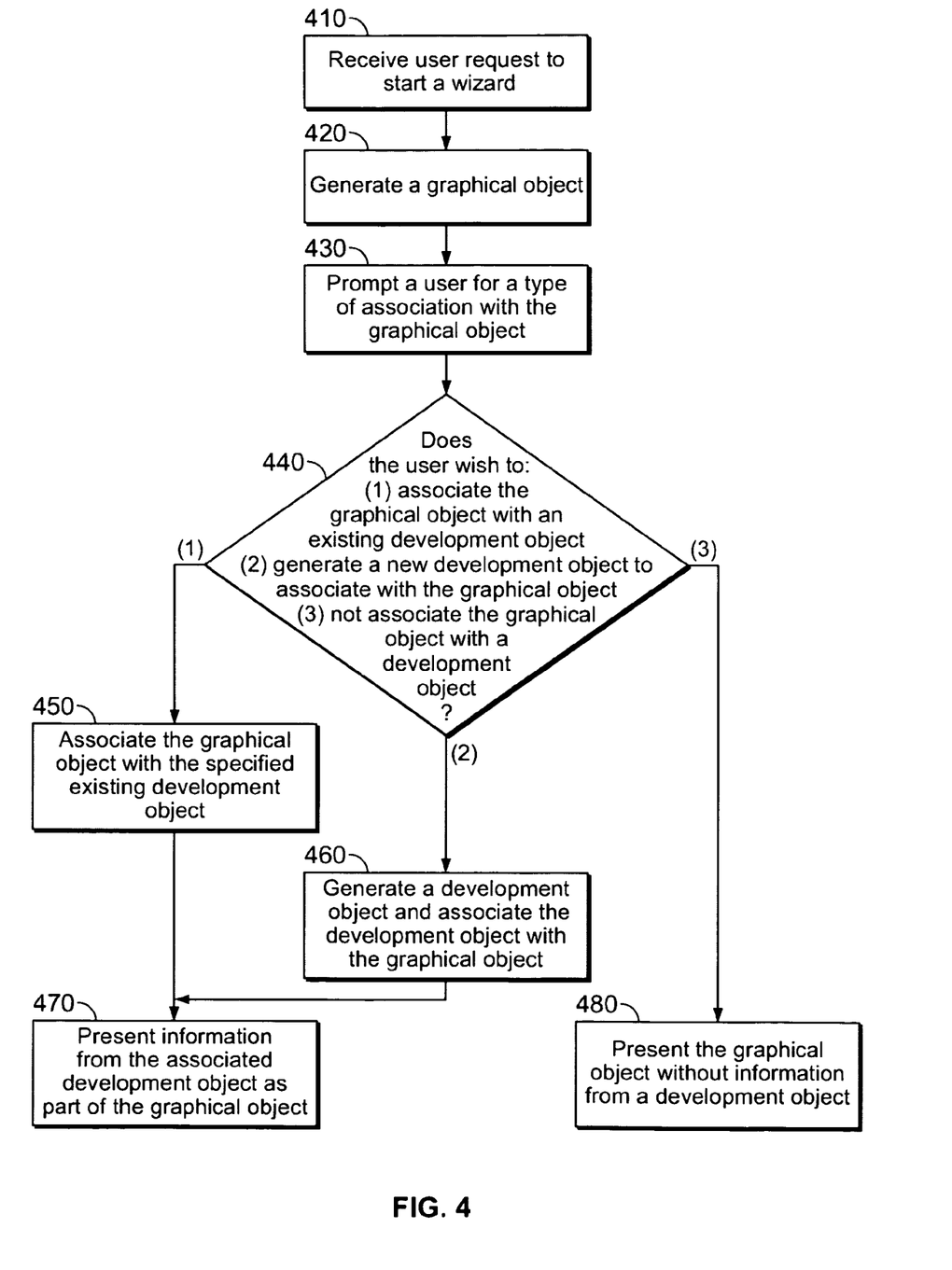
FIG. 4 is a flowchart of a sample process for generating graphical objects.

FIG. 4 is a flowchart of a sample process for generating graphical objects. In general, a wizard is a mechanism that provides an interface, or a series of interfaces, that support a user in performing a task. In FIG. 4, the wizard is one of many mechanisms of a modeling editor that can be used to support a user who desires to generate graphical objects. Other tools that can support a user in generating graphical objects include, for example, a stencil chooser that allows a user to choose from stencils that can be dragged and dropped onto a view area where graphical objects are drafted.

At 410, the modeling editor receives a request to start a wizard. Any user event can cause a modeling editor to receive a request to start a wizard. For example, in a mouse-driven graphical user interface, a user can right-click and a context menu can appear. From that context menu, the user can select a menu item named "start wizard," which can cause a request to start a wizard to be received at the modeling editor.

A graphical object can be generated at 420. A graphical object can be generated as part of the wizard. For example, in response to receiving the request to start a wizard, the wizard can start and an interface can be provided for selecting a pre-defined graphical object to generate. In response to a user selection of a pre-defined graphical object, the modeling editor can generate the selected graphical object.

At 430, a user is prompted to choose a type of association that should be generated for the generated graphical object. As an example, the user can be prompted in a graphical user interface by a dialog box that includes a selection of radio buttons, each of which corresponds to different types of associations that can be generated. The choices that that are offered to the user in the example in FIG. 4 include (1) associating the generated graphical object with an existing development object, (2) generating a new development object and associating the generated graphical object with the newly generated development object, and (3) not associating the graphical object with a development object (i.e., not generating an association). At 440, a decision is made by the modeling editor as to which choice was selected by the user.

If the user chooses the first choice, the generated graphical object is associated with a specified, existing development object at 450. As an example, in response to a user selecting the first choice, a user can be prompted with a selectable list of development objects that are part of an application model (e.g., a list of Java classes and JavaBeans). The user can select one or more items from the selectable list and the modeling editor can generate an association between the selected development objects and the generated graphical object. Because the focus of a modeling editor can be to generate such associations (i.e., associations between existing graphical objects and development objects), a modeling editor can be focused on including a shape editor for choosing pre-defined shapes and tools for selecting development objects that should be associated with selected, pre-defined shapes (e.g., generating a binding between a the content of a graphical model and an attribute of a development object).

If the user chooses the second choice, a new development object, such as a Java class, is generated and the generated graphical object is associated with that development object at 460. As an example, in response to a user selecting the first choice, a user can be prompted with a selectable list of development objects that can be generated (e.g., a Java class). In response to selecting a development object, the selected development object can be generated. Then, the generated development object can be associated with the generated graphical object. As another example, a user can choose to generate a JavaBean (i.e., a development object) and the JavaBean can be associated with the generated graphical object of 420. Then, the JavaBean can be generated.

If either the first or second choice is chosen, information from the associated development object is presented as part of the graphical object at 470. For example, if a graphical object were a box and a development object were a C++ class named "HelloWorld", the name of the class can appear in a graphical user interface where the box is presented (e.g., "HelloWorld" can appear in the center of a box). Although presenting a graphical object can include displaying on a display device the graphical object to a user, presenting need not be so limited. Presenting a graphical object can include passing the graphical object to other software components. For example, presenting a graphical object can include passing the graphical object to a software component for further processing.

Any combination of mechanisms and/or techniques can be used to present information from the associated development object as part of the graphical object. As an example, a graphical user interface can be used that includes a view area for viewing graphical models. Information that is presented from a development object need not be identical to information that is in the development object. For example, if a name of a JavaBean is presented as part of a graphical object, the name can be changed to make the name easier for a user to view. As an example of how this can happen, naming conventions can be adopted for an application model, such as a first naming convention that requires each word in a name to be capitalized, and a second naming convention that does not permit names to have spaces between words. Thus, a name according to those conventions might be, "ApplicationUserInterfaceDevelopmentObject" and a corresponding, preferred presentation of that name might be "Application User Interface Development Object" (i.e., spaces between each word). Thus, in that example, the modeling editor can derive the preferred presentation of the name from the development object's name, in accordance with the naming conventions. Other techniques can be used to derive information from a development object. Also, other techniques can present information from an application model. For example, a schema can be used to present information about development objects in corresponding graphical objects. A schema is a model that defines a representation of development objects (or properties of development objects) as graphical objects or aspects of graphical objects. Following the example, a schema can be used to represent parts of an application model as graphical objects (e.g., a schema where classes are boxes), such that graphical objects can be presented according to that schema, thus presenting information from an associated development object.

Referring back to 440, if the modeling editor determines that a user chose the third choice (i.e., not to associate the graphical object), the generated graphical object is not associated with a development object. At 480, the unassociated graphical object is presented as a "free-standing" graphical object that has no connection to the underlying application model.

In other implementations of a modeling editor, the wizard can vary. For example, the series of selections offered to a user can differ. Although the sample process of FIG. 4 is shown as being composed of a certain number and type of processes, additional and/or different processes can be used instead. Similarly, the processes need not be performed in the order depicted. Thus, although a few implementations have been described in detail above, other modifications are possible. For example, in alternative implementations of the process of FIG. 4, a graphical object that is associated with a development object need not present information from the associated development object. As an example of those implementations, a graphical object can be associated with a development object and the association can be a reference that is used when the associated development object is accessed via the graphical object; however, information from the associated development object need not be presented as part of a graphical object.

The disclosed subject matter and all of the functional operations described herein can be implemented in digital electronic circuitry, or in computer software, firmware, or hardware, including the structural means disclosed in this specification and structural equivalents thereof, or in combinations of them. The disclosed subject matter can be implemented as one or more computer program products, i.e., one or more computer programs tangibly embodied in an information carrier, e.g., in a machine-readable storage device or in a propagated signal, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network. Data for a computer program can be stored in a file.

As used herein, the term "document" (sometimes referred to as "electronic document") means a set of electronic data, including both electronic data stored in a file and electronic data received over a network. An electronic document does not necessarily correspond to a file and may be stored in volatile memory, a persistent storage device, and the like. A document may be stored in a portion of a file that holds other documents, in a single file dedicated to the document in question, or in a set of coordinated files.

The processes and logic flows described herein, including the method steps of the disclosed subject matter, can be performed by one or more programmable processors executing one or more computer programs to perform functions of the disclosed subject matter by operating on input data and generating output. The processes and logic flows can also be performed by, and apparatus of the disclosed subject matter can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the disclosed subject matter can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The disclosed subject matter can be implemented in a computing system that includes a back-end component (e.g., a data server), a middleware component (e.g., an application server), or a front-end component (e.g., a client computer having a graphical user interface or a Web browser through which a user can interact with an implementation of the disclosed subject matter), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Other implementations may be within the scope of the following claims.

The following is claimed:

1. A computer program product, stored on a machine-readable medium, the computer program product comprising instructions operable to cause a data processing apparatus to:
    display an integrated development environment, the integrated development environment including a first user interface for managing an application model and a second user interface for drafting a graphical model,
    wherein the application model corresponds to an application being developed, the application model comprising a plurality of development objects used in the application and relationships between the development objects,
    wherein the graphical model comprises a plurality of graphical objects that represent, graphically, the development objects in the application model and the relationships between the development objects,
    and wherein the first and second user interfaces display a design-time view of the application model corresponding to the application and the graphical model corresponding to the application model;
    generate, independent of the application model and in response to input from the user, one or more first graphical objects;
    select, in response to input from the user, a first development object from the plurality of development objects to be associated with a first graphical object of the one or more first graphical objects; and
    associate the first development object with the first graphical object.

2. The computer program product of claim 1, wherein the second user interface comprises a modeling editor for generating the graphical model.

3. The computer program product of claim 1, wherein the second user interface comprises a modeling editor for editing the graphical model.

4. The computer program product of claim 1, wherein a graphical model is drafted manually in the second user interface.

5. The computer program product of claim 1, wherein the one or more first graphical objects in the graphical model are assigned different association types to one or more corresponding development objects in the application model.

6. The computer program product of claim 1, wherein the second user interface comprises a vector-based drawing tool for drafting the graphical model.

7. The computer program product of claim 1, wherein the graphical model comprises one or more graphical objects, and wherein a graphical object in the graphical model is a free formed object or a pre-defined object selected from a template of graphical objects.

8. The computer program product of claim 5, wherein a first association type comprises a link between a first graphical object and a first development object, and wherein different links between different graphical objects and development objects access different information about the development object.

9. The computer program product of claim 5, wherein a first association type is used for navigating between a first graphical object and a first development object, and wherein a second association type is a data binding between a second graphical object and a second development object.

10. The computer program product of claim 1, the computer program product further comprising instructions operable to cause data processing apparatus to generate, independent of the application model and in response to input from the user, one or more second graphical objects, wherein the one or more second graphical objects in the graphical model are not associated with any development objects in the application model.

11. The computer program product of claim 10, the computer program product further comprising instructions operable to cause data processing apparatus to:
select, in response to input from the user, a first object that is not a development object to be associated with a second graphical object of the one or more second graphical objects; and
associate the first object with the second graphical object.

12. The computer program product of claim 1, the computer program product further comprising instructions operable to cause data processing apparatus to:
select, in response to input from the user, a second development object to be associated with a second graphical object of the one or more second graphical objects; and
associate the first graphical object with the second graphical object to establish a nested relationship between said first and second development objects.

13. A system including a processor and memory for designing and modeling applications comprising:
an integrated development environment, the integrated development environment including a first user interface for managing an application model and a second user interface for drafting a graphical model,
wherein the application model corresponds to an application being developed, the application model comprising a plurality of development objects used in the application and relationships between the development objects,
wherein the graphical model comprises a plurality of graphical objects that represent, graphically, the development objects in the application model and the relationships between the development objects, and
wherein the first and second user interfaces display a design-time view of the application model corresponding to the application and the graphical model corresponding to the application model,
the integrated development environment performing the steps of:
generating, independent of the application model and in response to input from the user, one or more first graphical objects;
selecting, in response to input from the user, a first development object from the plurality of development objects to be associated with a first graphical object of the one or more first graphical objects; and
associating the first development object with the first graphical object.

14. The system of claim 13, wherein the second user interface comprises a modeling editor for generating the graphical model.

15. The system of claim 13, wherein the second user interface comprises a modeling editor for editing the graphical model.

16. The system of claim 13, wherein a graphical model is drafted manually in the second user interface.

17. The system of claim 13, wherein the one or more first graphical objects in the graphical model are assigned different association types to one or more corresponding development objects in the application model.

18. The system of claim 13, wherein the second user interface comprises a vector-based drawing tool for drafting the graphical model.

19. The system of claim 13, wherein the graphical model comprises one or more graphical objects, and wherein a graphical object in the graphical model is a free formed object or a pre-defined object selected from a template of graphical objects.

20. A method of designing and modeling applications, the method comprising:
displaying an integrated development environment, the integrated development environment including a first user interface for managing an application model and a second user interface for drafting a graphical model,
wherein the application model corresponds to an application being developed, the application model comprising a plurality of development objects used in the application and relationships between the development objects,
wherein the graphical model comprises a plurality of graphical objects that represent, graphically, the development objects in the application model and the relationships between the development objects, and
wherein the first and second user interfaces display a design-time view of the application model corresponding to the application and the graphical model corresponding to the application model;
generating, independent of the application model and in response to input from the user, one or more first graphical objects;
selecting, in response to input from the user, a first development object from the plurality of development objects to be associated with a first graphical object of the one or more first graphical objects; and
associating the first development object with the first graphical object.

21. The method of claim 20, further comprising generating the graphical model using a modeling editor, wherein the second user interface comprises the modeling editor.

22. The method of claim 20, further comprising editing the graphical model using a modeling editor, wherein the second user interface comprises the modeling editor.

23. The method of claim 20, further comprising manually drafting the graphical model in the second user interface.

24. The method of claim 20, wherein the one or more first graphical objects in the graphical model are assigned different association types to one or more corresponding development objects in the application model.

25. The method of claim 20, wherein the second user interface comprises a vector-based drawing tool for drafting the graphical model.

26. The method of claim 20, wherein the graphical model comprises one or more graphical objects, and wherein a graphical object in the graphical model is a free formed object or a pre-defined object selected from a template of graphical objects.

* * * * *